US008162172B2

(12) United States Patent
Eberle et al.

(10) Patent No.: US 8,162,172 B2
(45) Date of Patent: Apr. 24, 2012

(54) DEPRESSION FOR FEEDING BALL-SHAPED BODIES AND A DEVICE FOR THE STACKING AND DISTRIBUTION OF A DEFINED NUMBER OF BALL-SHAPED BODIES

(75) Inventors: Walter Eberle, Bernried (DE); Peter Guenzl, Penzberg (DE); Peter Hloch, Penzberg (DE); Christoph Hundt, Munich (DE); Thomas Lindner, Polling (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1157 days.

(21) Appl. No.: 11/678,099

(22) Filed: Feb. 23, 2007

(65) Prior Publication Data
US 2007/0199950 A1 Aug. 30, 2007

(30) Foreign Application Priority Data

Feb. 24, 2006 (EP) .................................. 06003815

(51) Int. Cl.
*B23Q 7/12* (2006.01)
*B65H 9/00* (2006.01)
(52) U.S. Cl. .......... 221/156; 221/183; 221/93; 221/263; 221/333; 221/264; 220/501; 414/417; 193/44; 241/175
(58) Field of Classification Search ................ 221/183, 221/93, 263, 333, 264, 156; 220/501; 414/417; 193/44; 241/175
See application file for complete search history.

(56) References Cited

U.S. PATENT DOCUMENTS

| 2,615,567 | A | * | 10/1952 | Campbell | 209/680 |
| 3,545,154 | A | * | 12/1970 | Bobzin et al. | 52/460 |
| 3,545,164 | A | * | 12/1970 | Middleton | 53/446 |
| 3,552,600 | A |   | 1/1971  | Hoffman | |
| 4,072,251 | A | * | 2/1978  | Huang | 222/333 |
| 4,395,184 | A | * | 7/1983  | Braden | 414/17 |
| 4,466,554 | A | * | 8/1984  | Hanacek et al. | 221/1 |
| 4,627,225 | A |   | 12/1986 | Faller et al. | |
| 4,648,529 | A |   | 3/1987  | Blakemore et al. | |
| 4,771,912 | A | * | 9/1988  | van Wingerden | 221/75 |
| 4,788,931 | A | * | 12/1988 | Nitta et al. | 118/503 |
| 4,834,264 | A |   | 5/1989  | Siegel et al. | |
| 4,960,195 | A | * | 10/1990 | Yamaguchi et al. | 193/44 |
| 5,329,749 | A |   | 7/1994  | Yamamoto et al. | |

(Continued)

FOREIGN PATENT DOCUMENTS

DE 198 18 417 A1 2/1999

(Continued)

*Primary Examiner* — Gene O. Crawford
*Assistant Examiner* — Rakesh Kumar
(74) *Attorney, Agent, or Firm* — Dinsmore & Shohl LLP (57) ABSTRACT

A method and device for the removal of balls from a supply is disclosed. The device has a horizontal plate having one or a plurality of circular orifices of identical size in the form of transcurrent orifices running vertically from the upper side to the lower side. The plate on its upper side exhibits a depression around each orifice, in conjunction with which the base of the depression are curved, the periphery of the depression exhibits an elliptical, oval or spindle-shaped form at the level of the surface of the plate, the mid-point of the orifice in each case lies on the mid-point of the longitudinal axis and the transverse axis of the periphery of the depression, and the base of the depression is inclined towards the mid-point of the orifice along the longitudinal axis.

17 Claims, 8 Drawing Sheets

U.S. PATENT DOCUMENTS

| | | | |
|---|---|---|---|
| 6,074,609 A * | 6/2000 | Gavin et al. | 422/99 |
| 6,381,841 B1 * | 5/2002 | Tan et al. | 29/884 |
| 6,742,464 B1 * | 6/2004 | Chiu | 111/174 |
| 2002/0040521 A1 | 4/2002 | Farnworth et al. | |
| 2002/0179696 A1 | 12/2002 | Pattanaik et al. | |
| 2005/0269348 A1 * | 12/2005 | Limback et al. | 221/263 |

FOREIGN PATENT DOCUMENTS

| | | |
|---|---|---|
| EP | 1 033 566 A1 | 6/2000 |
| JP | 062 36630 A | 8/1994 |

* cited by examiner

DEPRESSION FOR FEEDING BALL-SHAPED BODIES AND A DEVICE FOR THE STACKING AND DISTRIBUTION OF A DEFINED NUMBER OF BALL-SHAPED BODIES

FIELD OF THE INVENTION

The present invention relates generally to dispensers, and in particular to a depression for feeding ball-shaped bodies and a device for the stacking and distribution of a defined number of ball-shaped bodies.

BACKGROUND OF THE INVENTION

Devices which can be used to feed cuboidal objects, such as for example microchips, from a stock into a shaft, with the shaft having a rectangular or oval cross section, are known from document U.S. Pat. No. 4,960,195. U.S. Pat. No. 4,960,195 discloses a horizontal plate having orifices of identical size with a rectangular or oval cross section, the plate on its upper side exhibiting a depression around each orifice. At the level of the plate surface, the periphery of the depression exhibits an oval or rectangular form. The wall and the base of an oval depression are curved and the base of the oval depression narrows in the direction of the center of the orifice. Similar devices are known from JP 36630/1987 (cited in accordance with U.S. Pat. No. 4,960,195). In this case, the plate has a shaft with a rectangular cross section. On one side, the plate has a depression with a circular cross section, which narrows conically towards the center of the rectangular cross section.

The removal of balls from a supply in a specified quantity at a specified point in time and the positioning of the balls for the purpose of their controlled, mechanical removal is a more specific technical problem, for which a number of proposed solutions are likewise already described in the prior art.

U.S. Pat. No. 3,552,600 describes a ball dispenser, a device for controlling the removal of balls of identical size from a supply. The device disclosed therein comprises a supply container, a shaft with a hopper-shaped feed arrangement and a conveyor spindle. The latter contains a groove, by means of which a ball is removed from the shaft and ejected by causing the spindle to rotate.

U.S. Pat. No. 4,648,529 describes an arrangement having a ball reservoir that is connected to a circular hopper. The constricted end of the hopper faces towards the bottom and discharges into a channel, the diameter of which corresponds to the diameter of the balls in the reservoir. The balls, which are of identical size, arrive under the effect of gravity in the channel, in which they are arranged one after the other. At its end, the channel is interrupted by a lock chamber, which is able to accommodate only a single ball at a time. The lock chamber is movably arranged. The orifices in the lock chamber are slightly offset by means of an elastic spring, so that either a ball is able to leave the channel, but not the lock chamber, or so that a ball is able to leave the lock chamber, but not the channel. By pressing against the spring and subsequent relaxation, one ball at a time drops into the lock chamber and is then released from the device.

DE 198 18 417 C2 discloses a shaft to accommodate microbodies, for example balls, in conjunction with which the height of the shaft determines the number of microbodies that can be accommodated. The upper end of the shaft is expanded into the form of a hopper. The microbodies are removed individually from the shaft by means of a suction mechanism.

US 2002/0040521 A1 describes a template framework for positioning balls of solder. The template framework consists of a plate having chambers in the form of bores, in each of which a single ball of solder fits. The template framework is supported on a base in such a way that the orifices in the bores on the one hand face towards the base and on the other hand are open in an upward direction. Each bore is filled with a ball, so that the solder can then be fixed in the respective position on the base by heating by means of a laser. US 2002/0179696 A1 describes an arrangement for the positioning of balls of solder, in which a chamber of a template is filled from a superjacent ball supply, in conjunction with which there is arranged above the chamber a hopper-shaped groove, in which the balls from the supply collect and, for the purposes of charging, are led to the chamber.

EP 1 033 566 B1 discloses a device for filling a plurality of individual grinding spaces with balls, which are used as grinding balls. The device comprises a plate with 96 transcurrent, circular orifices, which are arranged in a regular form as an 8×12 grid pattern. The diameter of the orifices is larger than the diameter of the balls. Movably arranged on the plate is a slide, which, in the inserted state, constitutes the base of the orifices, so that in this state balls are capable of being inserted into the orifices. The plate is then moved over a block with grinding spaces, which are arranged in the same 8×12 grid pattern, so that the orifices in the plate are situated in alignment over the orifices in the grinding spaces. The slide is withdrawn from the plate, and the grinding bodies drop into the grinding spaces.

Balls, for example intended for use as grinding bodies, in many cases consist of materials which may not possess any smooth surfaces, but rather rough surfaces. Examples of this are balls made of glass or ceramic materials (for example sintered ceramics, hard porcelain), mineral rocks (for example marble, agate), metals (for example iron, tungsten carbide) or plastics (for example polyamide, Teflon) and two-phase bodies (for example steel bodies enclosed in Teflon).

SUMMARY OF THE INVENTION

It is against the above background that the present invention provides a supply container filled with balls, which container possesses one or a plurality of orifices in its base, in conjunction with which the diameter of each orifice is sufficiently large to permit the passage of a ball. After charging the supply, in particular with balls packed in a multi-layer arrangement, the balls obstruct one another in conjunction with exiting via the orifice(s), so that only a few balls, or even no balls, are able to leave the supply under the effect of gravity. Even by agitating the supply container, no uniform and predictable (quantity per unit of time) exit of balls is achieved through the orifices. The present invention modifies a base plate with one or a plurality of orifices in such a way that the obstruction of the balls preventing them from leaving the supply container through the orifices is reduced.

Figure 1:
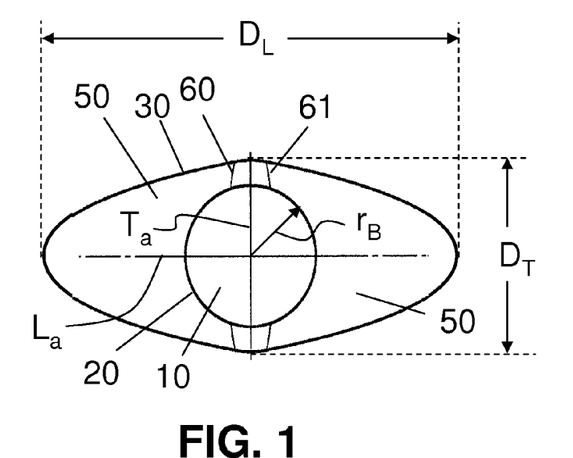
FIG. 1 is a schematic top view of an individual depression for feeding balls according to an embodiment of the present invention.

The inventors were surprised to find that a depression for feeding balls as depicted in FIG. 1 leads to an improved exit of the balls from the store into the orifice. It was also surprising that balls are fed in particularly successfully if depressions of this type, for a plurality of orifices arranged next to one another, overlap one another.

In one embodiment, the present invention provides a device comprising a horizontal plate having two or more transcurrent orifices of identical size and running vertically from the upper side to the lower side, the plate on the upper side exhibiting a first depression around each orifice, and the wall and base of the first depression being curved, characterized in that the openings are circular, for example in the form of orifices, the periphery of each first depression exhibits an elliptical, oval or spindle-shaped form at the level of the surface of the plate, the base of the first depression is inclined towards the center of the orifice along the longitudinal axis, the mid-point of each orifice in each case lies on the mid-point of the longitudinal axis and the transverse axis of the periphery of the first depression arranged above it, two or more first depressions are arranged on a common longitudinal axis, and the peripheries of two or more first depression overlap one another.

A further embodiment of the invention involves the use of a device in accordance with the invention for the distribution of balls. A further embodiment of the invention is a method for the removal of a predetermined number of balls from a supply of balls of essentially identical size, comprising: providing a supply of balls in a supply container having a device in accordance with the invention as a base plate, in conjunction with which the radius of every orifice corresponds to the average radius of the balls multiplied by a factor of between 1.05 and 1.95; providing a parallelepipedic block having one or a plurality of transcurrent orifices of circular cross section running vertically from the upper side to the lower side, in conjunction with which the quantity, diameter and position of the orifices correspond to those of the orifices in the base plate, the base plate lies on the block, and the block is capable of being displaced in relation to the base plate, so that in a first position the orifices in the base plate are in alignment with the orifices in the block (Position 1), and in a second position the base plate and the block are displaced in relation to one another in such a way that no balls can pass through the orifices in the base plate into the orifices in the block (Position 2), and the length of the orifices in the block is selected in such a way that, in each orifice, a predetermined number of balls can be stacked on top of one another, and that the uppermost ball in each case ends up essentially flush at the level of the upper edge of the respective orifice, but without protruding beyond the edge; providing a closing plate that is capable of being displaced in relation to the block beneath the block, having one or a plurality of transcurrent orifices running vertically from the upper side to the lower side, in conjunction with which the quantity, diameter and position of the orifices correspond to those of the orifices in the base plate, and the closing plate is so arranged that, in a first position, it provides a base for the orifices in the block (Position 3), and in a second position it exposes the orifices in the base plate in a downward direction (Position 4); filling the orifices in the block, in conjunction with which the base plate and the block are arranged in Position 1 and the block and the closing plate are arranged in Position 3; and removing the balls from the orifices in the block by the arrangement of the base plate and the block in Position 2 and the arrangement of the block and the closing plate in Position 4, in conjunction with which one or a plurality of collecting tubes is/are supported beneath the orifices.

These and other features and advantages of the present invention will be more fully understood from the following description of various embodiments of the present invention taken together with the accompanying drawings briefly described hereinafter.

DETAILED DESCRIPTION

Reference will now be made in detail to several embodiments of a depression for feeding ball-shaped bodies and a device for the stacking and distribution of a defined number of ball-shaped bodies according to the invention that are illustrated in the accompanying drawings. These embodiments are set forth for the purpose of illustrating and aiding in the understanding of the invention, and are not to be construed as limiting.

The designation of particular characteristics by numbers is used consistently in all the figures, unless indicated to the contrary. The figures are not to a uniform scale. However, within the individual figures, the proportions of the individual shape-describing elements (distances, angles, radii, contours) are in each case reproduced accurately with respect to one another and correspond to an illustrative embodiment. For purposes of convenience and clarity only, directional terms, such as, top, bottom, left, right, up, down, over, above, below, beneath, rear, back, front, horizontal, and vertical may be used with respect to the accompanying drawings.

The following observations are particularly applicable to various expressions used herein, such as to "balls of essentially identical size", which in one embodiment is synonymous with "more or less identically sized balls". In one embodiment, this means that the diameter of such balls varies on average by up to 10% or less. Stated as a multiple of the ball radius ($r_K$), the diameter of such balls in one embodiment varies by up to $2r_K/10$ or less. In another embodiment, the expression "ball" also comprises essentially spherical bodies. This is understood to denote that the distance corresponding to the radius of an ideal ball between the mid-point and a random point on the surface varies on average by up to 10% or less. In relation to the average radius, this corresponds to $2r_K/10$ or less.

In one embodiment, the expression "orifice(s)" is understood to denote a through bore(s), such as for example, a cylindrical hole(s) produced in a solid material.

In another embodiment, the expression "ball" is used on the one hand to designate a spherical body, but also in the context of the invention to designate an approximately spherical body, both consisting in each case of a solid material. The surface of a ball can be smooth or rough. Balls in the sense of the definition are previously disclosed, for example, as balls for ball bearings, beads of glass or some other material including natural substances (for example mother-of-pearl, amber, wood), or as "grinding balls" for ball mills. The latter in one embodiment, consist of steel or some other metal, agate, tungsten carbide, sintered corundum or zirconium oxide.

Figure 15:
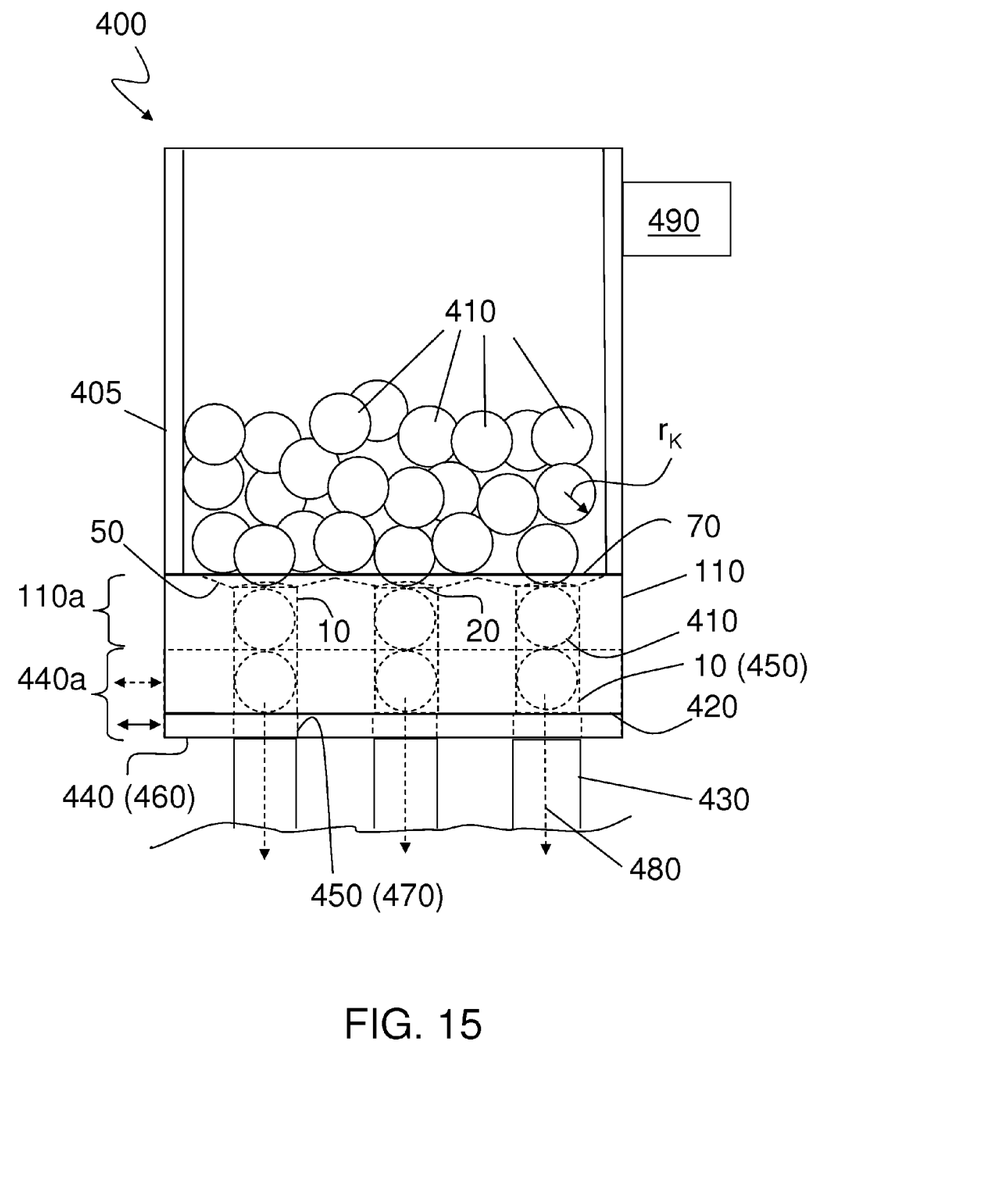
FIG. 15 is a side view of a ball dispenser for the stacking and distribution of a defined number of ball-shaped bodies and having a depression for feeding the ball-shaped bodies according to the present invention.

With reference first to FIG. 15, a ball dispenser 400 for the stacking and distribution of a defined number of ball-shaped bodies is shown. The ball dispenser 400 a supply container 405 filled with balls 410 of essentially identical size. The container 405 in one embodiment is equipped with a level and horizontally oriented base plate 110, in conjunction with which one or a plurality of circular orifices 10 in the form of transcurrent orifices running vertically from an upper surface 70 to a lower surface 420 of the base plate 110 for the purpose of releasing the balls 410. The base plate 110 on its upper surface 70 facing towards the balls 410 exhibits a depression of a first kind 50 around each orifice 10 for feeding the balls 410 to the orifices 10 according to the present invention, which is best shown by FIG. 1. According to the invention, the base plate 110 of this kind consists of a solid material, which in one embodiment is a solid material selected from polymer plastics, woods and metals. In another embodiment, the material of the balls 410 has a density between 5 g/cm$^3$ and 8 g/cm$^3$.

FIG. 1 shows an enlarged top view of an individual depression of the first kind (hereinafter referred to as a "V1 depression") 50 for feeding balls 410 (FIG. 15) through the base plate 110 according to one embodiment of the present invention. From an upper surface periphery 30, the V1 depression 50 inclines downward to the orifice 10 having a circular periphery 20. As shown, the periphery 30 of the V1 depression 50 exhibits an elliptical, oval or spindle-shaped form at the level of the upper surface 70 of the base plate 110 (FIG. 15).

For convenience, a longitudinal axis, designated with reference symbol "$L_a$" and a transverse axis designated with reference symbol "$T_a$" of the V1 depression 50 are illustrated in FIG. 1. As shown, the point of intersection of the axes $L_a$ and $T_a$, and the mid-point of the circular periphery 20 occur at a single point, such that the orifice 10 is located centrally in the depression 50. Spanning the distance between the upper surface periphery 30 and the circular periphery 20 are also provided opposing contours 60 and 61. As shown, the opposing contours 60 and 61 blend together along the transverse axis.

One possible means of producing the V1 depression 50 in the base plate 110 involves the use of a milling cutter with a spherical cutting head. The expression "periphery" as in upper surface periphery 30, designates the contour that is left in the upper surface 70 of the base plate 110 by the milling operation or by some other machining process. The upper surface periphery 30 forms the boundary line which separates the upper surface 70 of the base plate 110 from the orifices 10 centrally located in the V1 depressions 50. The contours 60 and 61 are created on the condition that the cutting head is caused to move from the right and from the left in the direction of the mid-point of the orifice 10, and that the cutting head in this case describes a depression, such as V1 depression 50, having an inclination running towards the mid-point of the circular periphery 20.

As shown, the V1 depressions 50 according to the invention having an elliptical, oval or spindle-shaped periphery can be described in terms of their extent along the longitudinal axis $L_a$ and the transverse axis $T_a$. The invention generally relates to axially symmetrical forms having a periphery (i.e., upper surface periphery 30), the extent of which along the longitudinal axis $L_a$ is greater than the extent along the transverse axis $T_a$. These axes $L_a$ and $T_a$ also help to define the position of the orifice 10 in the V1 depression 50. According to the invention, the mid-point of the orifice 10 in each case lies at the mid-point of the longitudinal axis $L_a$ and the transverse axis $T_a$ of the V1 depression 50. The mid-point of the orifice 10 and the point of intersection of the longitudinal axis $L_a$ and the transverse axis $T_a$ of the periphery 30 of the V1 depression 50, which in one embodiment coincide with one another.

The longitudinal extent of an individual V1 depression 50, which does not overlap or is not connected to another V1 depression 50, is dimensioned as the distance of the points of intersection of the periphery and the longitudinal axis $L_a$ which is shown in FIG. 1 as distance $D_L$. In one embodiment, the distance $D_L$ of the V1 depression 50 has a value of between 3 $r_B$ and 8 $r_B$, stated as a multiple of the radius ($r_B$) of the orifice 10. In another embodiment, the distance $D_L$ has a value of between 5 $r_B$ and 7 $r_B$, in still other embodiment, a value of between 6 $r_B$ and 6.5 $r_B$, and in still yet another embodiment a value of around 6.4 $r_B$.

The transverse extent of an individual V1 depression 50, which does not overlap or is not connected to another V1, is dimensioned as the distance of the points of intersection of the periphery and the transverse axis $T_a$ which is shown in FIG. 1 as distance $D_T$. In one embodiment, the distance $D_T$ of the V1 depression 50 has a value of between 2.5 $r_B$ and 5 $r_B$, stated as a multiple of the radius ($r_B$) of the orifice 10. The distance $D_T$ in another embodiment has a value of between 2.2 $r_B$ and 3.5 $r_B$, in still another embodiment a value of between 2.5 $r_B$ and 3 $r_B$, and in still yet another embodiment a value of around 2.8 $r_B$. The ranges of fluctuation of the indicated values can be obtained from the technically achievable accuracies on the date of registration at reasonable cost (with commercially available machine tools).

In one embodiment of the invention, the base plate 110 exhibits two or more orifices 10, and two or more V1 depressions 50 are arranged on a common longitudinal axis, in conjunction with which two or more peripheries 30 of a plurality of V1 depressions 50 overlap one another in an overlapping fashion. The overlapping of the two or more V1 depressions 50 at the ends of the longitudinal sides actually gives rise to straight boundary lines in the contour. This can be caused by the guiding of the cutting head when producing depressions in this kind of arrangement. In one embodiment, an arrangement of a plurality of orifices 10 with a plurality of V1 depressions 50 is provided, in conjunction with which the base plate 110 comprises four or more orifices 10 and the V1 depressions 50 are so arranged that two or more longitudinal axes and two or more transverse axes of these V1 depressions 50 intersect one another at right angles. Corresponding arrangements of the above described embodiments are depicted in FIGS. 2 thru 7, for example.

Figure 2:
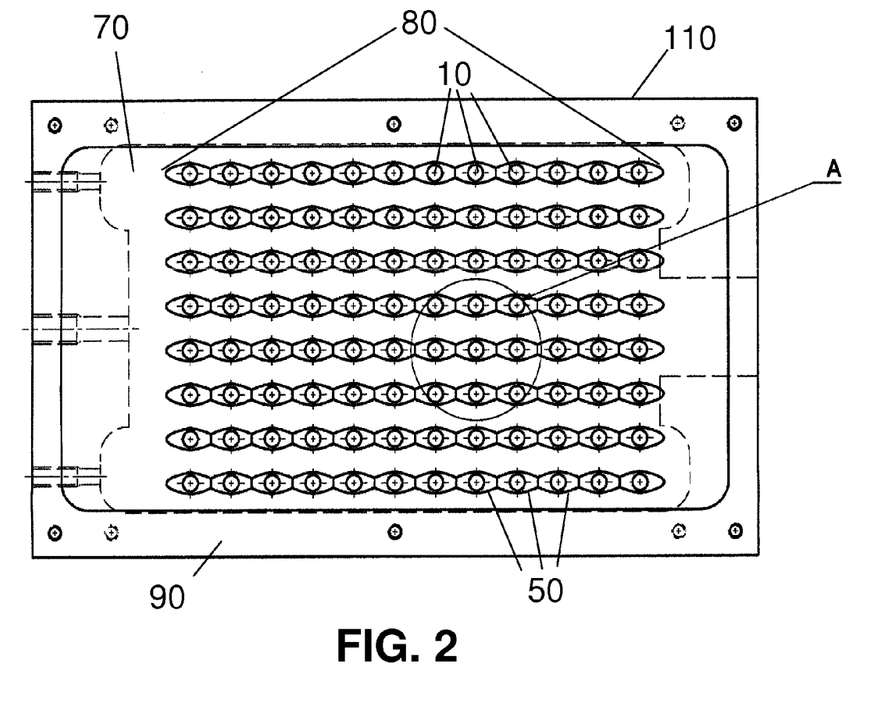
FIG. 2 is a schematic top view of a tube-containing base of a ball store with a horizontal base plate having orifices in an 8×12 format according to an embodiment of the present invention.

FIG. 2 is a top view of the tube-containing base plate 110 of the ball dispenser 400 (FIG. 15) with the upper surface 70 having 96 orifices 10 in an 8×12 format, each individual orifice 10 is provided with a V1 depression 50 according to one embodiment of the invention. The V1 depressions 50 are positioned in such a way that they overlap one another at the ends along the longitudinal axes. Reference symbol 80 denotes a row of 12 orifices 10 with overlapping V1 depressions 50. The V1 depressions 50 located at the ends of each row 80 overlap only on one side. The detail section designated with "A" is illustrated on an enlarged scale in FIG. 3. A border 90 for the tubes is also provide, which is positioned on and secured to the base plate 110.

Figure 3:
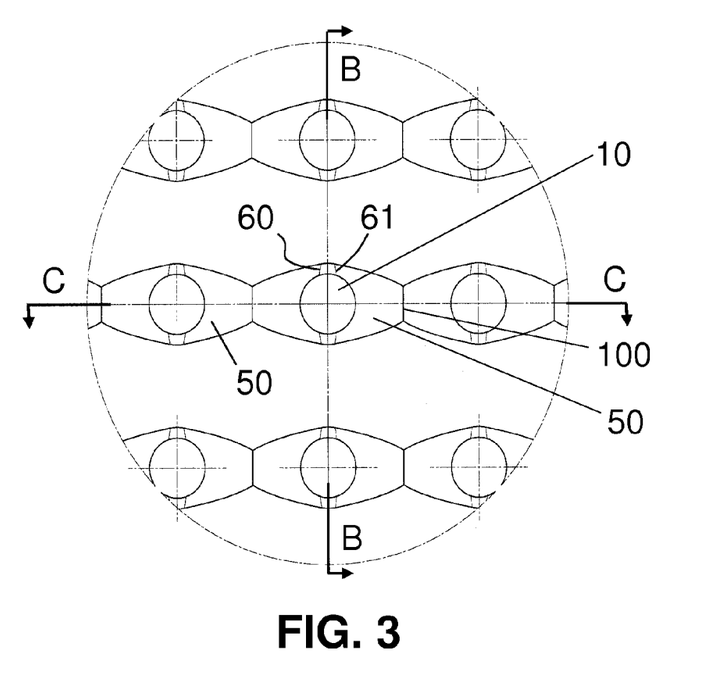
FIG. 3 is an enlarged schematic top view taken along detail section "A" in FIG. 2, and showing an arrangement having a plurality of mutually overlapping depressions according to an embodiment of the present invention.
Figure 4:
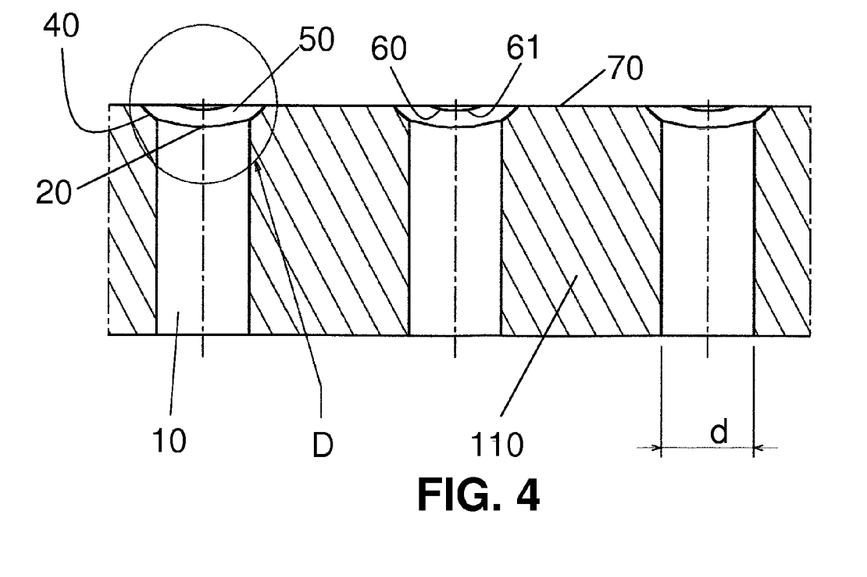
FIG. 4 is a section view taken along section line "B-B" in FIG. 3.
Figure 6:
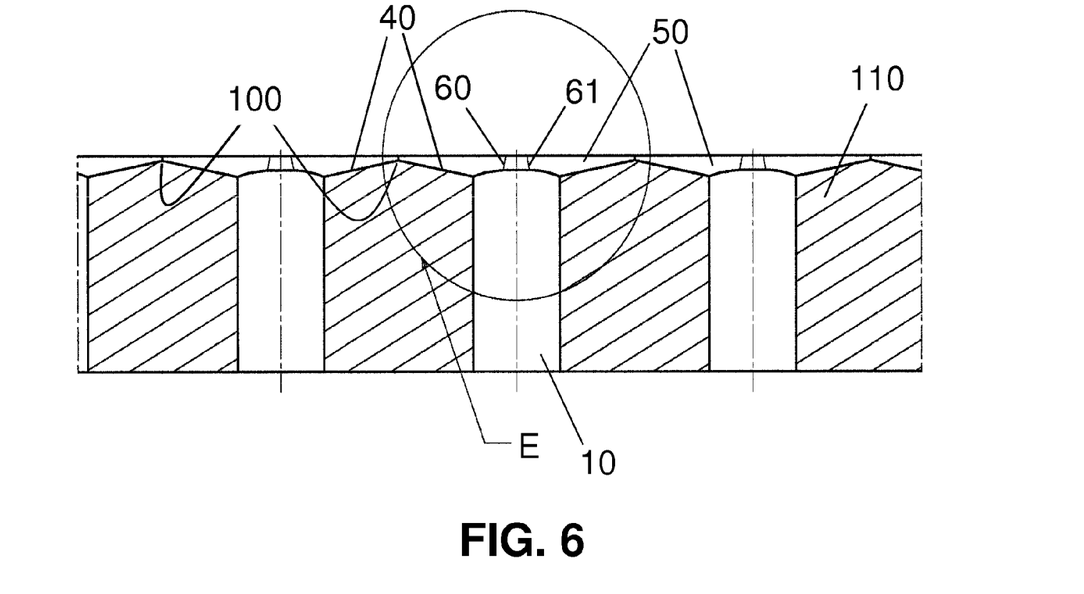
FIG. 6 is a section view taken along section line "C-C" in FIG. 3.

FIG. 3 is an illustration of the view outlined by detail section "A" in FIG. 2, and shows an arrangement having a plurality of mutually overlapping V1 depressions 50 according to an embodiment of the present invention. The section line "B-B" is depicted in FIG. 4, and the section line "C-C" is depicted in FIG. 6. Reference symbol 100 denotes the straight boundary line in the contour edge produced by milling overlapping V1 depressions 50 into the base plate 110 (FIG. 2), and hereinafter referred to as the "overlapping contour edge".

FIG. 4 is a section view taken along section line "B-B" in FIG. 3. Detail section "D" is illustrated on an enlarged scale in FIG. 5. The symbol designation "d" denotes the diameter of the orifice 10 in base plate 110. Reference symbol 40 denotes a base of the V1 depression 50. As shown, the V1 depressions 50 are separated transversely by portions of the upper surface 70.

Figure 5:
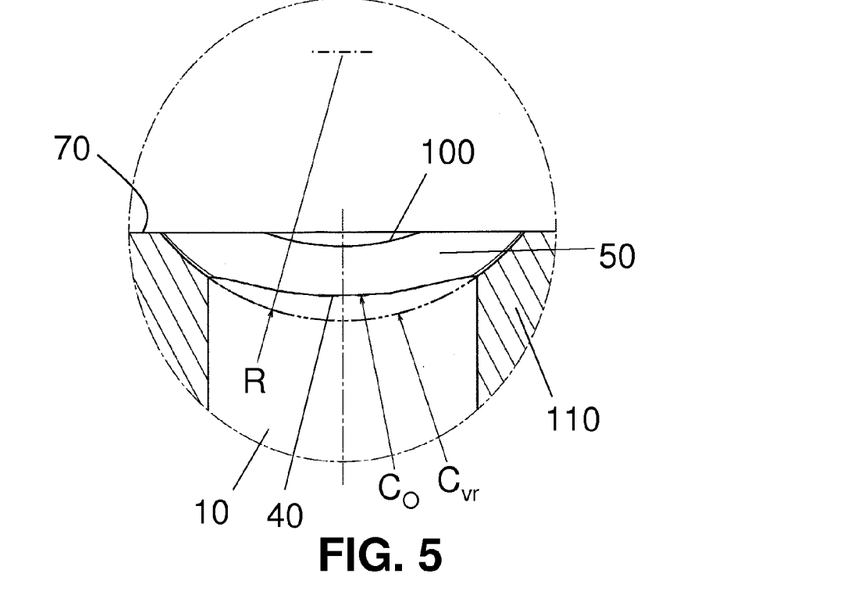
FIG. 5 is an enlarged view of detail section "D" in FIG. 4.

FIG. 5 is an illustration of the view outlined by detail section "D" in FIG. 4. Symbol designation "R" (arrow) denotes the radius of a spherical cutting head (not shown), with which the V1 depression 50 is milled in the material of the base plate 110. Symbol designation "$C_{vr}$" denotes the virtual geometrical extension of the curve produced by the cutting head with the radius "R". Symbol designation "$C_o$" denotes the geometrical cutting on the orifice 10. The base 40 of the V1 depression 50 leads from the opening of the orifice 10 to the overlapping contour edge 100 in the longitudinal direction (i.e., into the page).

FIG. 6 is a section view taken along section line "C-C" in FIG. 3. Detail section "E" is illustrated on an enlarged scale in FIG. 7. As shown, the bases 40 of the V1 depressions 50 overlap in the longitudinal direction (i.e., left to right) at the overlapping contour edges 100 formed therebetween.

Figure 7:
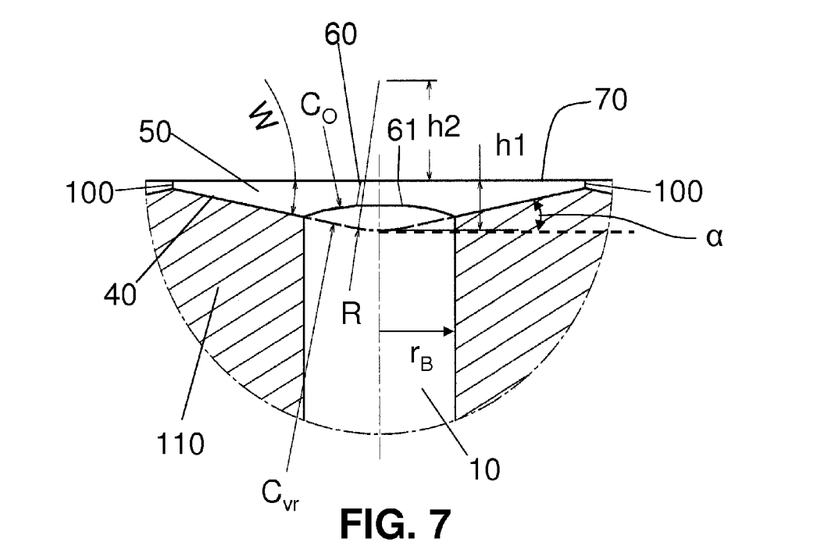
FIG. 7 is an enlarged view of detail section "E" in FIG. 6.

FIG. 7 is an illustration of the view outlined by detail section "E" in FIG. 6. As with FIG. 5, symbol designation "R" (arrow) denotes the radius of the spherical cutting head, with which the depression in the V1 depression 50 is milled in the material of the base plate 110. Symbol designation "W" denotes an angle of inclination. Symbol designation $C_{vr}$ denotes the virtual geometrical extension of the curve produced by the cutting head with the radius "R", and symbol designation $C_o$ denotes the geometrical cutting on the orifice 10. The distance designated by symbol "h1" represents a milling depth, in relation to the upper surface 70 of the base plate 110. The distances represented by symbols "h1" and "h2" are added together to give the radius R of the spherical cutting head.

As mentioned above previously, the base 40 of the V1 depression 50 along the longitudinal axis $L_a$ is inclined towards the mid-point of the orifice 10. This means that in one embodiment an oblique edge leads to the orifice 10 from the mutually most remote edges of the V1 depression 50 along the longitudinal axis. In one embodiment, the inclination of the base 40 on each of the two halves of the longitudinal axis of the V1 depression 50 exhibits an angle of inclination at (FIG. 7) of between 5° and 15°. In one embodiment, the angle of inclination α is between 11° and 12°, and in another embodiment, the angle of inclination α is 11.31° (1° corresponds to 1/360 of a full circle).

In another embodiment of the present invention, a base plate is provided with a depression of a second kind in the form of a groove which the inventors have found has a favourable influence on the feeding of the balls 410 into the orifices 10. A corresponding arrangement of this alternative base plate embodiment is depicted in FIGS. 8 thru 13, for example.

Figure 8:
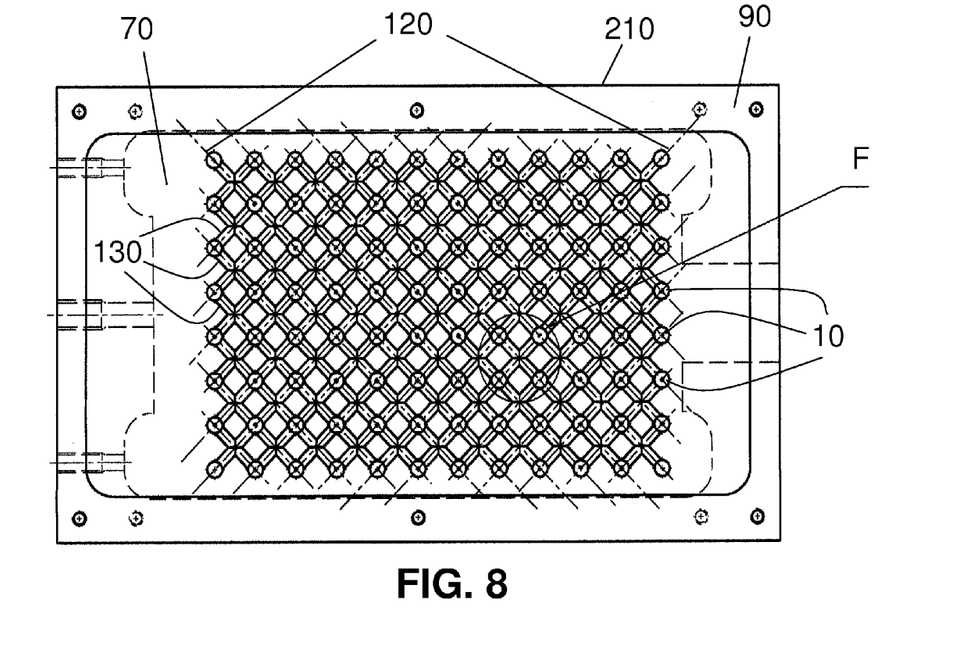
FIG. 8 is a schematic top view of a tube-containing base of a ball store with a base plate having 96 orifices arranged in an 8×12 format according to another embodiment of the present invention.

FIG. 8 shows a tube-containing base plate 210 of an alternative design having 96 orifices 10 arranged in an 8×12 format according to another embodiment of the invention. This alternative base plate 210 is both interchangeable with the base plate 110 and useful for dispensing balls 410 from the ball dispenser 400 (FIG. 15). As shown, the orifices 10 are connected diagonally by means of a plurality of depressions of a second kind (hereafter reference to as V2 depressions) 130. Reference symbol 120 denotes a row of 12 orifices 10. The detail section designated with "F" is illustrated on an enlarged scale in FIG. 9. In this embodiment, the V2 depressions 130 overlap between the rows 120. Border 90 for the tubes is also provide, which is positioned on and secured to a tube-containing base plate 210.

Figure 9:
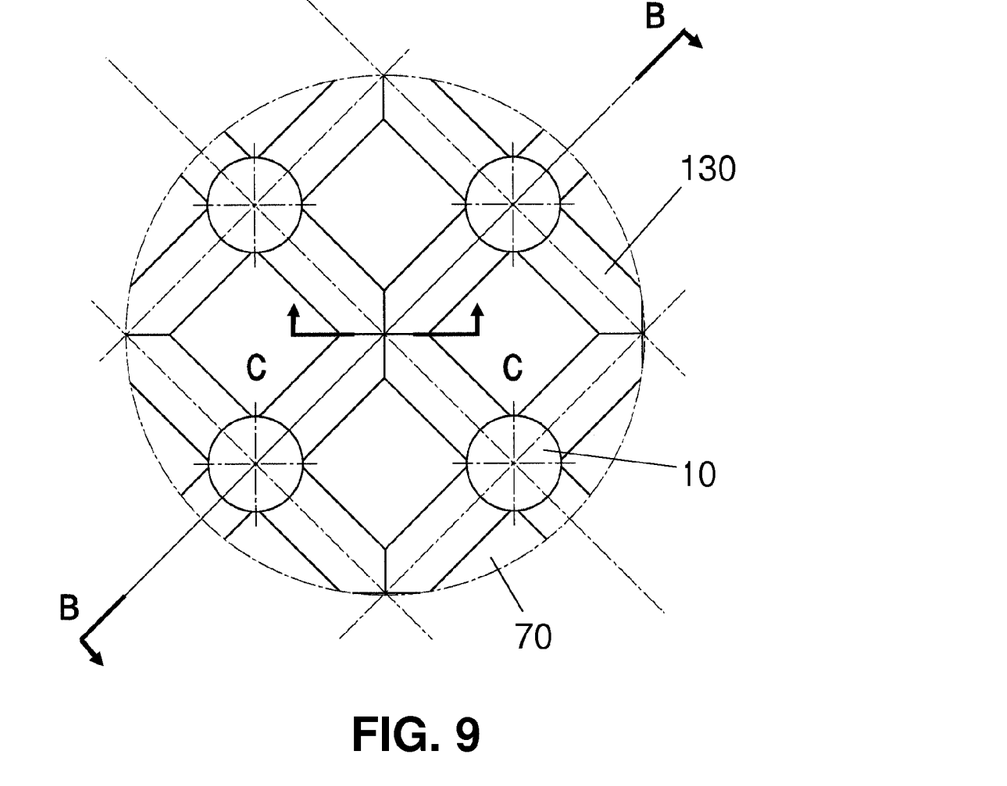
FIG. 9 is an enlarged view of detail section "F" in FIG. 8.

FIG. 9 shows an enlarged view of the embodiment illustrated by FIG. 8 having a plurality of orifices 10 which are connected diagonally by a plurality of V2 depressions 130.

Figure 10:
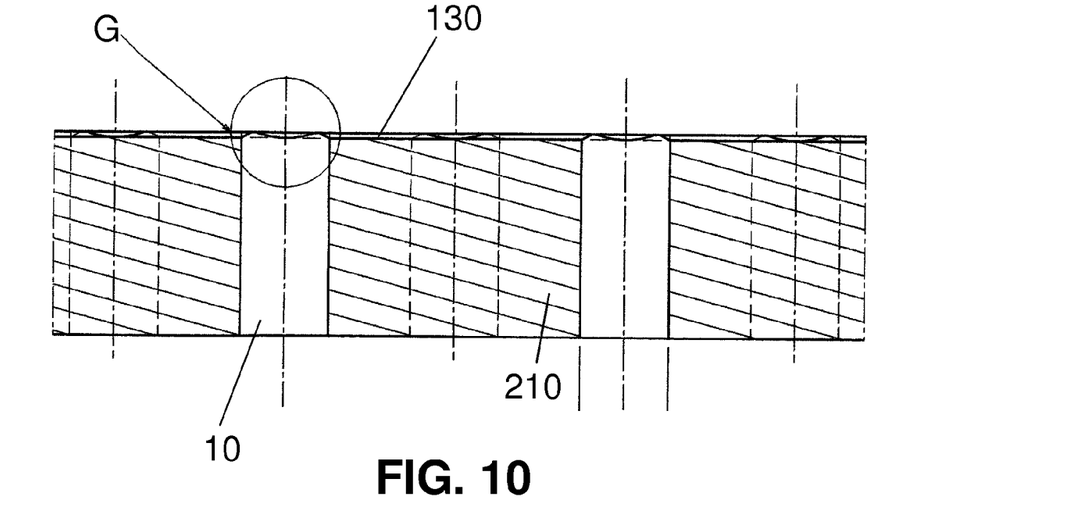
FIG. 10 is a section view taken along section line "B-B" in FIG. 9.

FIG. 10 is a section view taken along section line "B-B" in FIG. 9. As shown, the V2 depressions 130 intersect each other in a direction diagonally to the longitudinal direction (i.e., left to right) of the base plate 210. As shown, no orifice 10 is provided at the intersection of the V2 depressions 130.

Figure 11:
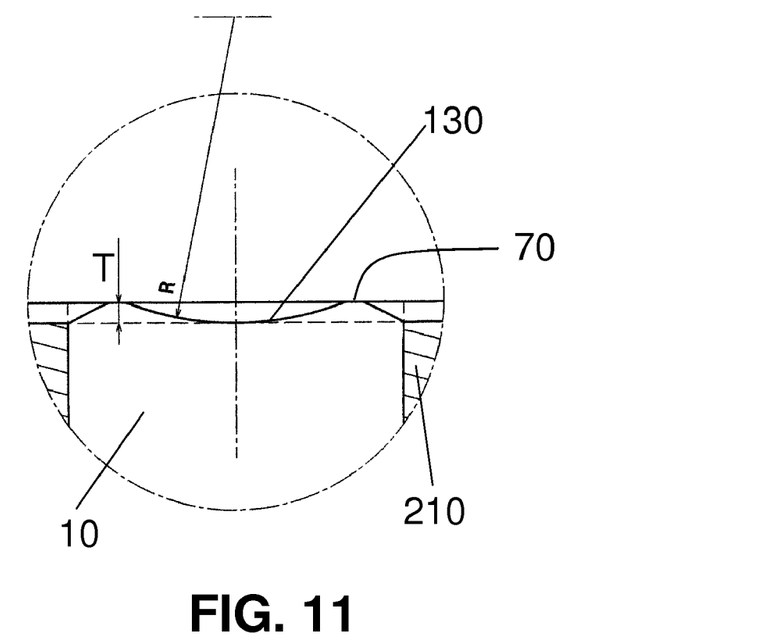
FIG. 11 is an enlarged view of detail section "G" in FIG. 10.

FIG. 11 is an illustration of the view outlined by detail section "G" in FIG. 10. Symbol designation "R" (arrow) denotes the radius of the spherical cutting head, with which the depression in a V2 depression 130 is milled in the material of the base plate 210. Symbol designation "T" denotes the distance, which gives the milling depth for a V2 depression 130.

Figure 12:
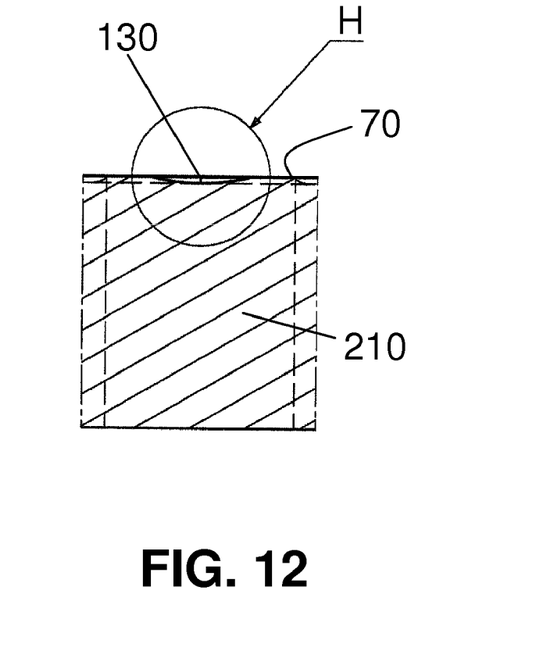
FIG. 12 is a section view taken along section line "C-C" in FIG. 9.

FIG. 12 is a section view taken along section line "C-C" in FIG. 9. Detail section "H" is illustrated on an enlarged scale in FIG. 13. As shown, the V2 depressions 130 provides a relatively shallow contour below the upper surface 70 of the base plate 210.

Figure 13:
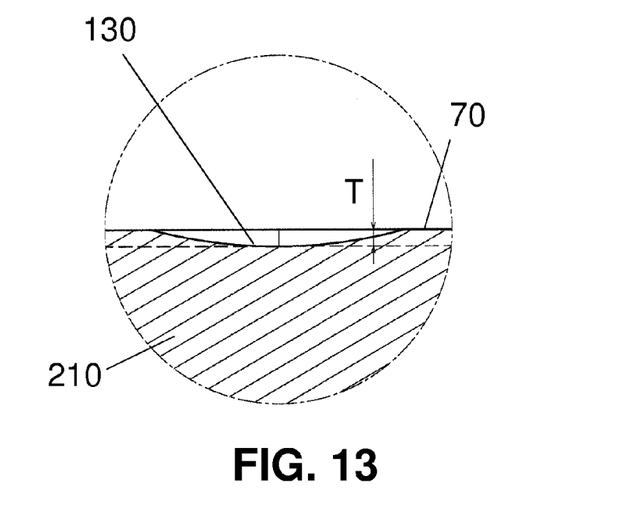
FIG. 13 is an enlarged view of detail section "H" in FIG. 12.

FIG. 13 is an illustration of the view outlined by detail section "H" in FIG. 12. Symbol designation "T" denotes the distance, which gives the milling depth for a V2 depression 130. It is to be appreciated that in one embodiment the milling depth T of the V2 depressions 130 is less than the milling depth h1 of the V1 depressions 50. A further embodiment of another alternative base plate design according to the present invention is shown by FIGS. 14A and 14B.

Figure 14A:
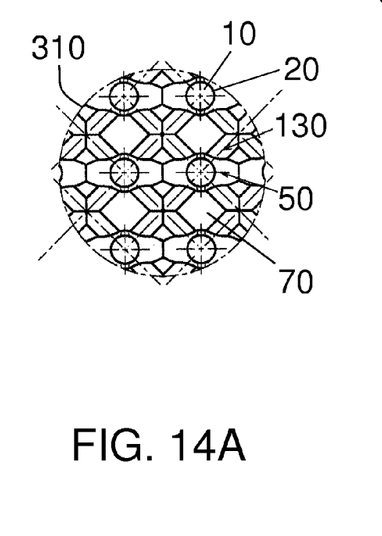
FIG. 14A is a top view of one upper side of a plate according to one embodiment of the present invention.
Figure 14B:
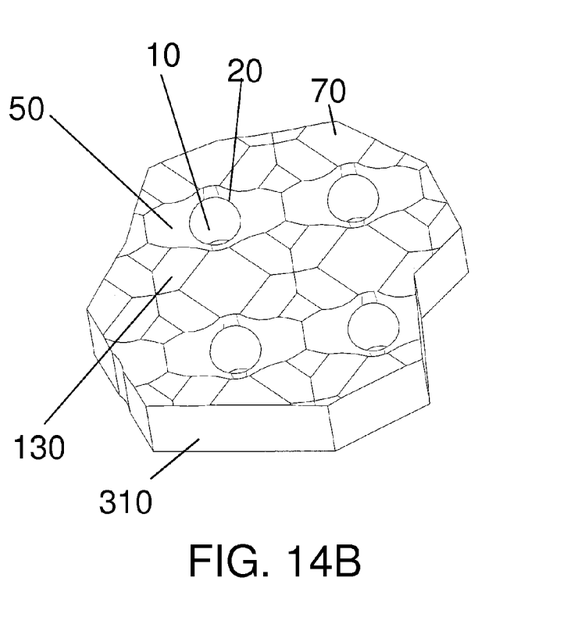
FIG. 14B is an oblique view of overlying structures of the plate shown in FIG. 14A.

FIG. 14A is a top view of another alternative design of a tube-containing base plate 310 according to another embodiment of the present invention. This alternative base plate 310, as with base plate 210, is both interchangeable with base plate 110 and useful for dispensing balls 410 from the ball dispenser 400 (FIG. 15). As shown, in this embodiment, the upper surface 70 of the base plate 310 includes the V1 depressions 50 depicted in FIGS. 1-7 and the V2 depressions 130 depicted in FIGS. 8-13. As with the previous embodiments, 96 orifices 10 may be provided in one embodiment in an 8×12 format, with the V1 depression 50 positioned in such a way that they overlap one another at the ends along the longitudinal axes (i.e., left to right), and with the V2 depressions 130 connecting the orifices 10 diagonally between the rows of V1 depressions 50. FIG. 14B is a representation in relief of the overlying structures in an oblique view of the base plate 310 of FIG. 14A.

In a further embodiment, a first orifice 10 is connected to either one or a plurality of further orifices 10 by means of one or more straight, horizontally oriented, curved V2 depressions 130, in conjunction with which the width of a V2 depression 130, stated as a multiple of the radius ($r_B$) of the orifice 10, has a value of between 1 $r_B$ and 2 $r_B$, and the depth of a V2 has a value of between 0.01 $r_B$ and 0.1 $r_B$.

With reference again to FIG. 15, the balls 410 from the ball dispenser 400 can be distributed into various receiving tubes 430 (partially shown) with the help of any one of the plates 110, 210, 310 according to the invention. In one embodiment, 96 tubes 430 are provided in a "multiwell" format. Tube holders (not shown) with 96 tubes 430 arranged in a regular pattern (e.g., the 8×12 format) are available, for example, from the company Integra Biosciences under the trade name Traxis®. Tubes of this kind are manufactured by Micronic BV (Lelystad, the Netherlands) and find widespread applications in biology, biochemistry or diagnostics. For filling such tubes 430 placed together into groups with balls, it is advisable to arrange the orifices 10 in the base plate 110 in such a way that precisely one orifice 10 is allocated to each tube 430, and that balls 410 from one orifice 10 are able to find their way directly into the tube 430 concerned. Such would be the same also if the ball dispenser 400 is provided with either base plate 210 or 310. A further "multiwell" embodiment comprises 384 tubes 430 arranged in a regular pattern. In a still further embodiment of the invention, 384 orifices 10 are arranged in any one of the base plates 110, 210, 310 in the form of a 16×24 grid pattern.

In a further embodiment, the ball dispenser 400 further comprises a parallelepipedic block 440 having one or a plurality of transcurrent orifices 450 running vertically from the upper side to the lower side, in conjunction with which the quantity, diameter and position of the transcurrent orifices 450 correspond to those of the orifices 10 in the base plate 110 (same if ball dispenser is provided with either base plates 210 or 310). The base plate 110 lies on the block 440, and the block 440 is capable of being displaced in relation to the base plate 110, so that in a first position the orifices 10 in the base plate 110 are in alignment with the transcurrent orifices 450 in the block 440, and in a second position the base plate 110 and the block 440 are displaced in relation to one another in such a way that no balls 410 can pass through the orifices 10 in the base plate 110 into the transcurrent orifices 450 in the block 440. Such would be the same also if the ball dispenser 400 is provided with either base plate 210 or 310.

In one embodiment, the thickness of the base plate 110 is selected in such a way that, in each orifice 10, a predetermined number of balls 410 can be stacked on top of one another, and that the uppermost ball in each case ends up essentially flush at the level of the upper edge or circular periphery 20 of the respective orifice 50, but without protruding beyond the periphery 20.

In another embodiment, a block 440a may be provided to a base plate 110a. The block 440a and base plate 110a in this embodiment have a respective thickness selected in such a way that, in each transcurrent orifice 450 of the block 440a and orifice 50 of the base plate 110a, a predetermined number of balls 410 can be stacked on top of one another, and that the uppermost ball in each case ends up essentially flush at the level of the upper edge or circular periphery 20 of the respective orifice 50 in the base plate 110a, but without protruding beyond the periphery 20. In such an embodiment, a closing plate 460 is provided that is capable of being displaced in relation to the block 440a beneath the block. The closing plate 460 has one or a plurality of transcurrent orifices 470 running vertically from the upper side to the lower side, in conjunction with which the quantity, diameter and position of the transcurrent orifices 470 correspond to those of the transcurrent orifices 450 in the block 440a. As with the block 440 in the above mentioned previous embodiment, the closing plate 460 is so arranged that, in a first position, it provides a base for the transcurrent orifices 450 in the block 440a and, in a second position, it exposes the transcurrent orifices 450 and orifices 50 in the base plate 110a in a downward direction to dispense a ball(s) 410 in the orifices 50, 450, 470 in to the corresponding tube 430 through the closing plate 460 (or block 440 in the previous embodiment) as indicated by the downward pointing arrows 480. In still another embodiment, the block 440a may move relative to both the base plate 110 and the closing plate 460 to provide the first and second positions, with the closing plate 460 in such an embodiment being stationary, and in still another embodiment the block 440a may move relative to the base plate 110 to provide the first and second positions, and the closing plate 460 may move relative to the block 440a to also provide the first and second positions for the purpose of accurately dispensing a desired quantity of balls 410 into the respective tube(s) 430 from the ball dispenser 400. In one embodiment, the ball dispenser 400 additionally comprises an agitating mechanism 490 for influencing the downward progression of the balls 410 in the container 405 into the orifices 10.

In one embodiment, the base plates 110, 210, 310 according to the invention are used for the distribution of balls 410 that are essentially of identical size. In such an embodiment, the radius ($r_B$) of every orifice 10 in the base plates 110, 210, 310, and the radius ($r_K$) of the balls 410 bear a relationship to one another. In any case, the diameter (d) of each orifice 10 is rather larger than the average diameter of the ball 410, so that balls 410 are able to exit from the supply container 405 through the orifice(s) 10. According to the invention, the radius ($r_B$) (FIG. 7) of each orifice 10 has a value of between 1.05 $r_K$ and 1.3 $r_K$, stated as a multiple of the average radius ($r_K$) of a ball 410. Similarly in one embodiment, the distance of the points with the greatest spacing lying on the transverse axis $T_a$ on the periphery of the V1 depression 50, i.e., distance $D_T$ (FIG. 1), has a value of between 3.5 $r_K$ and 4 $r_K$, stated as a multiple of the average radius ($r_K$) of a ball 410. Also in another embodiment, the inclination α (FIG. 7) of the base 40 to each of the two halves of the longitudinal axis $L_a$ of the V1 depression 50 exhibits an angle of inclination of between 11° and 12°.

A further aspect of the invention is a method for the removal of a predetermined number of balls 410 from a supply of balls (e.g., supply container 405) of essentially identical size. The method comprises providing a supply of balls 410 in a supply container 405 having a device in accordance with the invention as a base plate 110, 210, or 310, in conjunction with which the radius of every orifice 10 corresponds to the average radius of the balls 410 multiplied by a factor of between 1.05 and 1.95. The method further comprises providing a parallelepipedic block 440 having one or a plurality of transcurrent orifices 450 of circular cross section running vertically from the upper side to the lower side, in conjunction with which the quantity, diameter and position of the transcurrent orifices 450 correspond to those of the orifices 10 in the base plate 110, 210, or 310. The base plate 110, 210, or 310 lies on the block 440, and the block 440 is capable of being displaced in relation to the base plate 110, 210, or 310, so that in a first position the orifices 10 in the base plate 110, 210, or 310 are in alignment with the transcurrent orifices 450 in the block 440 (Position 1), and in a second position the base plate 110, 210, or 310 and the block 440 are displaced in relation to one another in such a way that no balls 410 can pass through the orifices 10 in the base plate 110, 210, or 310 into the transcurrent orifices 450 in the block 440 (Position 2).

In another method for the removal of a predetermined number of balls 410 from a supply of balls (e.g., supply container 405) of essentially identical size, the method comprises providing a supply of balls 410 in a supply container 405 having a device in accordance with the invention as a base plate 110, 210, or 310, in conjunction with which the radius of every orifice 10 corresponds to the average radius of the balls 410 multiplied by a factor of between 1.05 and 1.95; and providing a parallelepipedic block 440a having one or a plurality of transcurrent orifices 450 of circular cross section running vertically from the upper side to the lower side, in conjunction with which the quantity, diameter and position of the transcurrent orifices 450 correspond to those of the orifices 10 in the base plate 110, 210, or 310. The base plate 110, 210, or 310 lies on the block 440 and the length of the transcurrent orifices 450 in the block 440a is selected in such a way that, in each transcurrent orifice 450, a predetermined number of balls 410 can be stacked on top of one another, and that the uppermost ball in each case ends up essentially flush at the level of the circular periphery 20 of the respective orifice 50 of the base plate 110, but without protruding beyond the circular periphery 20. The method further comprises providing a closing plate 460 that is capable of being displaced in relation to the block 440a beneath the block 440a, having one or a plurality of transcurrent orifices 470 running vertically from the upper side to the lower side, in conjunction with which the quantity, diameter and position of the transcurrent orifices 470 correspond to those of the transcurrent orifices 450 in the block 440a, and the closing plate 460 is so arranged that, in a first position, it provides a base for the transcurrent orifices 450 in the block 440a (Position 3) and, in a second position, it exposes the transcurrent orifices 450 and orifices 10 in the base plate 110, 210, or 310 in a downward direction (Position 4) to dispense the balls 410 through the closing plate 460.

In another method for the removal of a predetermined number of balls 410 from a supply of balls (e.g., supply container 405) of essentially identical size, the method comprises providing a supply of balls 410 in a supply container 405 having a device in accordance with the invention as a base plate 110, 210, or 310, in conjunction with which the radius of every orifice 10 corresponds to the average radius of the balls 410 multiplied by a factor of between 1.05 and 1.95; and providing a parallelepipedic block 440a having one or a plurality of transcurrent orifices 450 of circular cross section running vertically from the upper side to the lower side, in conjunction with which the quantity, diameter and position of the transcurrent orifices 450 correspond to those of the orifices 10 in the base plate 110, 210, or 310. The base plate 110, 210, or 310 lies on the block 440 and the length of the transcurrent orifices 450 in the block 440a is selected in such a way that, in each transcurrent orifice 450, a predetermined number of balls 410 can be stacked on top of one another, and that the uppermost ball in each case ends up essentially flush at the level of the circular periphery 20 of the respective orifice 50 of the base plate 110, but without protruding beyond the circular periphery 20. The block 440a is capable of being displaced in relation to the base plate 110, 210, or 310, so that in a first position the orifices 10 in the base plate 110, 210, or 310 are in alignment with the transcurrent orifices 450 in the block 440a (Position 1), and in a second position the base plate 110, 210, or 310 and the block 440a are displaced in relation to one another in such a way that no balls 410 can pass through the orifices 10 in the base plate 110, 210, or 310 into the transcurrent orifices 450 in the block 440a (Position 2).

The method further comprises providing a closing plate 460 that is capable of being displaced in relation to the block 440a beneath the block 440a, having one or a plurality of transcurrent orifices 470 running vertically from the upper side to the lower side, in conjunction with which the quantity, diameter and position of the transcurrent orifices 470 correspond to those of the transcurrent orifices 450 in the block 440a, and the closing plate 460 is so arranged that, in a first position, it provides a base for the transcurrent orifices 450 in the block 440a (Position 3) and, in a second position, it exposes the transcurrent orifices 450 and orifices 10 in the base plate 110, 210, or 310 in a downward direction (Position 4) to dispense balls 410 through the closing plate 460. The method further comprises filling the transcurrent orifices 450 in the block 440a, in conjunction with which the base plate 110, 210, or 310 and the block 440a are arranged in Position 1 and the block 440a and the closing plate 460 are arranged in Position 3; and removing only the balls 410 from the transcurrent orifices 450 in the block 440a by the arrangement of the base plate 110, 210, or 310 and the block 440a in Position 2 and the arrangement of the block 440a and the closing plate 460 in Position 4, wherein the balls 410 situated in the transcurrent orifices 450 are dispended to one or a plurality of collecting tubes 430 supported beneath the transcurrent orifices 470 in the closing plate 460.

In one embodiment of the invention, the ball container 405 is agitated in a further step. Another embodiment of the invention is characterized in that the change in state from Position 1 and Position 3 to Position 2 and Position 4 takes place simultaneously. Particularly efficient operation of the method according to the invention is assured in this way.

Although the various embodiments of the present invention have been described using specific terms, such description is for illustrative purposes only, and it is to be understood that changes and variations may be made without departing from the spirit or scope of the following claims.

What is claimed is:

1. A device comprising:
   a horizontal base plate having two or more transcurrent orifices of identical size and running vertically from an upper side to a lower side, the base plate on the upper side exhibiting a first depression around each of the orifices, and a base of the first depression being curved, wherein:
   the orifices are circular,
   a periphery of each first depression exhibits a form selected from an elliptical, oval and spindle-shaped at the upper surface of the base plate,
   the base of the first depression is inclined towards a center of the orifice along a longitudinal axis,
   a mid-point of each of the orifices in each case lies on a mid-point of the longitudinal axis and a transverse axis of the periphery of the first depression arranged above it,
   two or more first depressions are arranged on a common longitudinal axis,
   opposing contours which, for each first depression, span between the orifice and the periphery along the transverse axis, and
   the peripheries of the two or more first depressions overlap one another;
   a supply container with balls of essentially identical size provided with the base plate;

a parallelepipedic block having one or a plurality of first transcurrent orifices of circular cross section running vertically from an upper side to a lower side, in conjunction with which:
quantity, diameter and position of the first transcurrent orifices of the block correspond to those of the orifices in the base plate,
the base plate lies on the block, and the block is capable of being displaced in relation to the base plate, so that, in a first position, the orifices in the base plate are in alignment with the first transcurrent orifices in the block and, in a second position, the base plate and the block are displaced in relation to one another in such a way that no balls can pass through the orifices in the base plate into the first transcurrent orifices in the block, and
the thickness of the block is selected in such a way that, in each first transcurrent orifice, a predetermined number of balls can be stacked on top of one another, and that the uppermost ball in each case ends up essentially flush at the level of the upper edge of the respective first transcurrent orifice, but without protruding beyond the edge;
a closing plate that is capable of being displaced in relation to the parallelepipedic block beneath the block, having one or a plurality of second transcurrent orifices running vertically from the upper side to the lower side, in conjunction with which:
quantity, diameter and position of the second transcurrent orifices correspond to those of the orifices in the base plate, and
the closing plate is so arranged that, in a first position, it provides a base for the first transcurrent orifices in the parallelepipedic block and, in a second position, it exposes the orifices in the base plate in a downward direction; and
one or a plurality of receiving tubes beneath the closing plate, in conjunction with which the quantity of the receiving tubes corresponds to the quantity of orifices, and every receiving tube is so arranged that balls dropping through the corresponding second transcurrent orifice in the closing plate can be received.

2. The device according to claim 1, wherein the periphery of the first depression extends along the longitudinal axis a distance of between 3 $r_B$ to 8 $r_B$, stated as a multiple of the radius ($r_B$) of the orifices.

3. The device according to claim 1, wherein the periphery of the first depression extends along the transverse axis a distance of between 2.5 $r_B$ to 5 $r_B$, stated as a multiple of the radius ($r_B$) of the orifices.

4. The device according to claim 1, wherein an inclination base on each of two halves of the longitudinal axis of the first depression exhibits an angle of inclination of between about 5° to about 15°.

5. The device according to claim 4, wherein the angle of inclination is between about 11° to about 12°.

6. The device according to claim 5, wherein the angle of inclination is 11.31°.

7. The device according to one of claim 1, wherein the base plate comprises four or more orifices, in conjunction with which a plurality of first depressions are so arranged that two or more longitudinal axes and two or more transverse axes of the first depressions intersect one another at right angles.

8. The device according to claim 7, wherein said orifices are 96 orifices arranged in the base plate in the form of an 8×12 grid pattern.

9. The device according to claim 7, wherein said orifices are 384 orifices arranged in the base plate in the form of an 16×24 grid pattern.

10. The device according to claim 1, further comprising a agitating mechanism.

11. A method of distributing balls comprising utilizing a device according to claim 1 for the distribution of balls.

12. The method of according to one of claim 11, wherein the balls consist of a material having a density of between 5 g/cm³ to 8 g/cm³.

13. The method according to claim 11, wherein the balls are essentially of identical size.

14. The method according to claim 13, wherein in the device the radius of each orifice has a value of between 1.05 $r_K$ to 1.3 $r_K$, stated as a multiple of the average radius ($r_K$) of a ball, on the periphery of each one of the first depressions, the distance between the points with the greatest spacing lying on the transverse axis has a value of between 3.5 $r_K$ to 4 $r_K$, stated as a multiple of the average radius ($r_K$) of a ball, and the inclination of the base to each of the two halves of the longitudinal axis of each one of the first depressions exhibits an angle of inclination of between 11° to 12°.

15. A method for the removal of a predetermined number of balls from a supply of balls of essentially identical size, comprising:
providing a supply of balls in a supply container having a device in accordance with claim 1 as a base plate, in conjunction with which the radius of every orifice corresponds to the average radius of the balls ($r_K$) multiplied by a factor of between 1.05 to 1.95;
providing a parallelepipedic block having one or a plurality of first transcurrent orifices of circular cross section running vertically from the upper side to the lower side, in conjunction with which:
quantity, diameter and position of the first transcurrent orifices correspond to those of the orifices in the base plate,
the base plate lies on the parallelepipedic block, and the parallelepipedic block is capable of being displaced in relation to the base plate, so that, in a first position, the orifices in the base plate are in alignment with the first transcurrent orifices in the parallelepipedic block (Position 1) and, in a second position, the base plate and the parallelepipedic block are displaced in relation to one another in such a way that no balls can pass through the orifices in the base plate into the first transcurrent orifices in the parallelepipedic block (Position 2), and
the length of the first transcurrent orifices in the parallelepipedic block is selected in such a way that, in each first transcurrent orifice, a predetermined number of balls can be stacked on top of one another, and that the uppermost ball in each case ends up essentially flush at the level of the upper edge of the respective first transcurrent orifice, but without protruding beyond the edge;
providing a closing plate that is capable of being displaced in relation to the parallelepipedic block beneath the block, having one or a plurality of second transcurrent orifices running vertically from the upper side to the lower side, in conjunction with which:
quantity, diameter and position of the second transcurrent orifices correspond to those of the orifices in the base plate, and
the closing plate is so arranged that, in a first position, it provides a base for the first transcurrent orifices in the parallelepipedic block (Position 3) and, in a second position, it exposes the orifices in the base plate in a downward direction (Position 4);

filling the first transcurrent orifices in the parallelepipedic block, in conjunction with which the base plate and the parallelepipedic block arranged in Position 1, and the parallelepipedic block and the closing plate arranged in Position 3; and removing the balls from the first transcurrent orifices in the parallelepipedic block by the arrangement of the base plate and the block in Position 2 and the arrangement of the block and the closing plate in Position 4, in conjunction with which one or a plurality of collecting tubes are supported beneath the orifices.

16. The method according to claim 15, further comprising agitating the store of balls.

17. The method according to claim 15, wherein the change in state from Position 1 and Position 3 to Position 2 and Position 4 takes place simultaneously.

\* \* \* \* \*